United States Patent [19]

Kuypers

[11] Patent Number: 4,506,695

[45] Date of Patent: Mar. 26, 1985

[54] PLASTIC TIRE VALVE

[75] Inventor: Harold A. Kuypers, Nashville, Tenn.

[73] Assignee: Scovill Inc., Waterbury, Conn.

[21] Appl. No.: 481,724

[22] Filed: Apr. 4, 1983

[51] Int. Cl.³ ............................................. F16K 15/20
[52] U.S. Cl. ................................. 137/223; 137/234.5; 137/541; 137/543
[58] Field of Search ..................... 137/223, 234.5, 541, 137/543; 152/427, DIG. 11

[56] References Cited

U.S. PATENT DOCUMENTS

| 1,829,556 | 10/1931 | Crowley | 137/234.5 |
| 2,068,266 | 1/1937 | Engel | 137/223 |
| 2,272,634 | 2/1942 | Bronson | 137/223 |
| 3,741,267 | 6/1973 | Thacker | 152/427 |

FOREIGN PATENT DOCUMENTS 1338891 11/1973 United Kingdom ............. 137/234.5

Primary Examiner—Harold W. Weakley
Attorney, Agent, or Firm—Dallett Hoopes

[57] ABSTRACT

A tire valve having a molded tubular plastic insert having a conical seat and adjacent the seat integrally molded inward radial ribs engaging and guiding a valve pin. To the pin is secured a valve element adapted to sealingly engage the seat. The insert is bonded within a molded rubber body.

2 Claims, 5 Drawing Figures

PLASTIC TIRE VALVE

BACKGROUND OF THE INVENTION

1. Field of the Invention

This invention relates to tire valves having tubular plastic inserts. More specifically, this invention relates to plastic tire valves having a minimum of parts and which maximize the flow of air through the valve during filling and discharging operations.

2. Description of the Prior Art

In the prior art, there have been disclosures of tire valves having plastic tubular inserts. An example is shown in U.S. Pat. No. 3,741,267 which issued June 26, 1973 to Stephen Thacker and which is assigned to the assignee of the present application. In such earlier disclosures, however, the plastic molded insert, while providing integral means for guiding the valve pin, did not truly maximize the possible air flow through the valve during filling or discharging operations. Moreover, such earlier disclosures required structure with elaborate valve element biasing means.

Another example of an earlier plastic valve structure is found in the U.S. Pat. No. 3,032,091 which issued May 2, 1962 to McCord. In such earlier arrangements, however, an inner annular flange in the plastic insert closely surrounds and guides the valve pin and seriously limits air flow through the valve.

Simple valve structures have been disclosed in tire valves in the prior art, though not in plastic tire valve structures. An example is shown in the old U.S. Pat. No. 2,260,646 which issued Oct. 28, 1941 to Sorokin. Such earlier structures include spring means surrounding the pin and above the valve seat to bias the valve closed.

SUMMARY OF THE INVENTION

Under the present invention, the plastic insert of the present tire valve includes a plurality of radially inward guide ribs above the valve seat adapted by themselves and without the need of additional guiding means to guide the positioning and movement of the valve pin at all times. Accompanying this benefit is the virtue that these guide ribs leave portions of the passage through the valve and immediately surrounding the valve pin entirely open for maximum flow of air.

BRIEF DESCRIPTION OF THE DRAWINGS

Other objectives and features of the invention will be apparent from a reading of the following specification and an inspection of the accompanying drawings in all of which there is disclosed a non-limiting embodiment of the invention.

In the drawings.

DESCRIPTION OF THE PREFERRED EMBODIMENT

Figures 1, 2, 3:
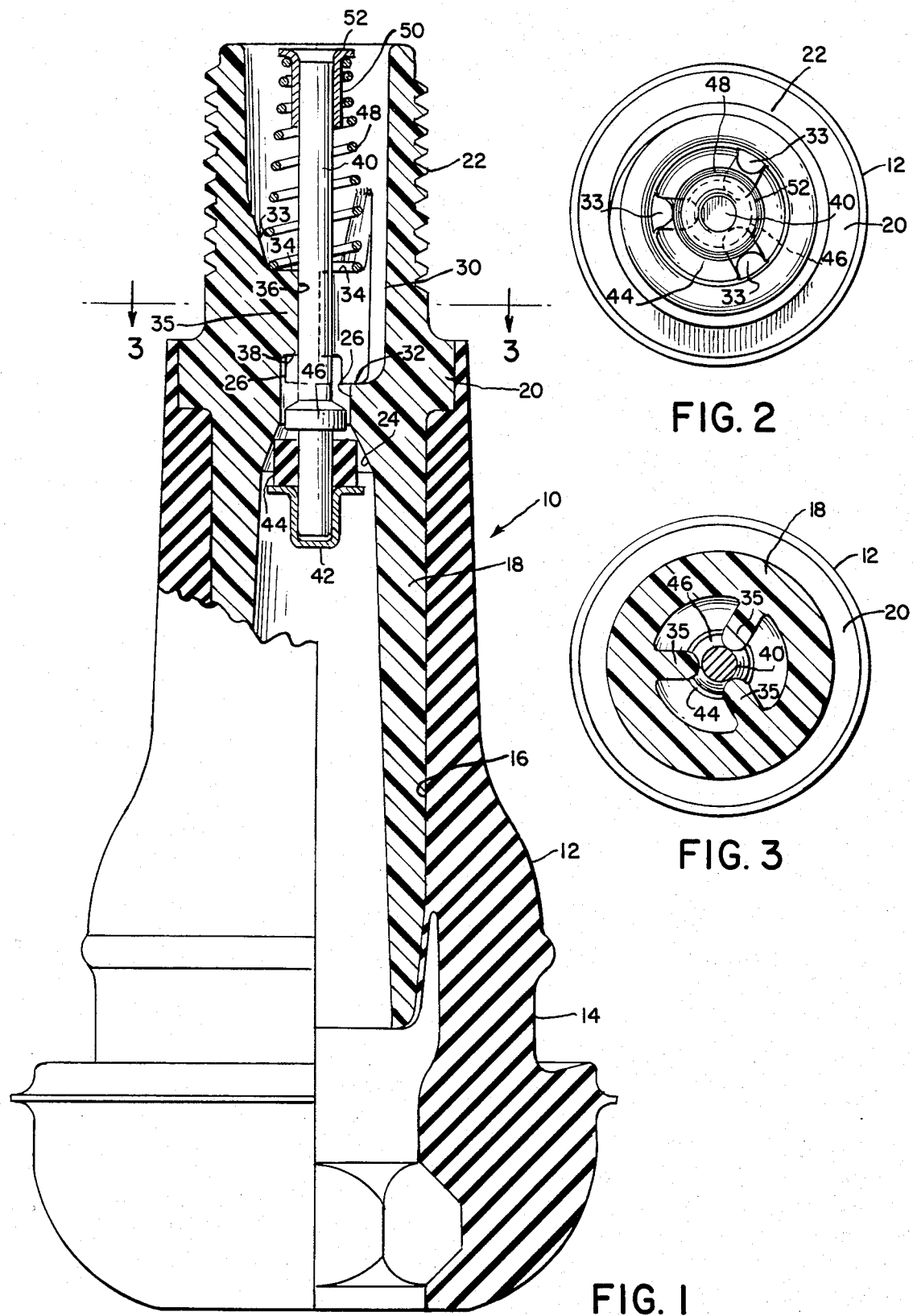
FIG. 1 is a side elevation partly in section of a valve embodying the invention.
FIG. 2 is a plan view.
FIG. 3 is a sectional view taken at the line 3—3 of FIG. 1, not extending below the plane of the top of body 12.
Figure 4:
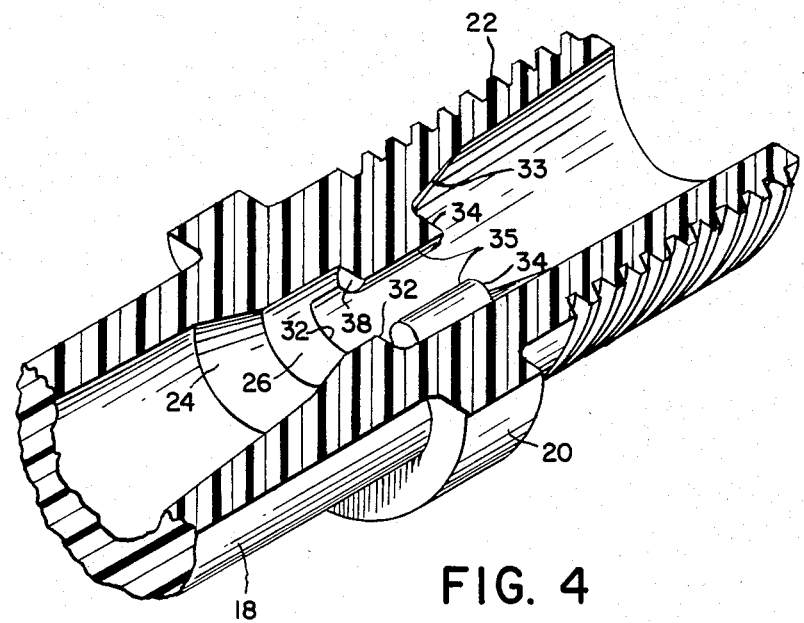
FIG. 4 is a fragmentary center line sectional view in perspective of the valve portion of the insert.

A tire valve embodying the invention is generally designated 10 in FIG. 1. It comprises a molded rubber body 12 formed with a bulbous base and a conventional circumferential groove 14 to engage sealingly in the rim hole opening of a vehicle wheel. The rubber body has a central opening 16 in which is bonded plastic insert 18. Clearly, the body 12 may be the rubber base of a tube-type valve such as a bicycle tire valve.

Preferably, the insert is a glass-reinforced thermoplastic polyester resin. Such a resin is available from DuPont under the trademark "Rynite". Such a plastic has appropriate properties so as to make rubber bonding to it practical. Certainly, plastic under other names by other manufacturers can be used with some degree of success.

As shown, the insert 18 is tubular and it is bonded inside the opening 16 in the rubber body. Intermediate its ends, the insert 18 is formed with an annular outward flange 20 to which rubber is also bonded. The upper end of the insert is exteriorly threaded as at 22.

The interior of the insert will now be described. From the tire end or lower end (as shown in FIG. 1) of the valve, the inside wall gradually tapers inward to a point below the flange 20 at which the inside surface sharply narrows to form a seat 24. The seat surrounds a passage defined by a cylindrical inside surface 26.

Figure 5:
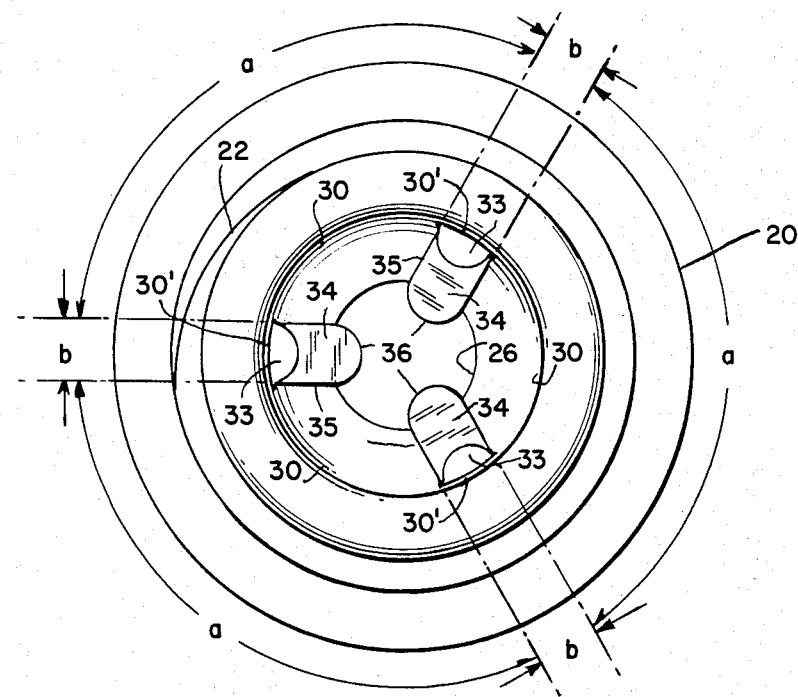
FIG. 5 is an enlarged top plan view of the insert with valve parts removed.

From the end of the valve remote from the tire or upper end (as shown in FIG. 1), the interior of the insert has a plurality of longitudinally disposed circumferential segments in two alternating groups a and b as shown in FIG. 5. The segments of the first group a, each gradually narrow as at 30, from one radius at the remote or upper end (FIG. 1) to an abrupt shelf at 32 inward to meet the generally cylindrical surface 26. The segments of the other group b each narrow as at 30' from the same radius at the same rate of incline as the segments of group a for a distance to a steeply inclined transition 33, leading to an abrupt shoulder 34 inward to a second radius spaced from the longitudinal axis of the insert to define a radial rib 35. The second segments then extend longitudinally as at 36 and then outward in an abrupt ledge 38 to meet the cylindrical inside surface 26.

The inward ends of the radial ribs 35 serve as the guiding means for the valve pin 40. The lower end of the pin is formed with the cap 42 which supports an annular valve element 44 just below a tapered guide annulus 46. As shown, the upper outer edge of valve 44 engages the seat 24 to close off the valve.

Above the radial ribs terminating inward in the straight run 36 is an axial spring 48 which is nested at its lower end in the juncture between the shoulder 34 and the incline 33 and is thereby centered by the incline 33 as shown at 48 (FIG. 2) with respect to the axis. At its upper end the pin is formed with a fixed bushing 50 which has an outward annular flange 52 which engages the upper end of spring 48.

As will be seen, the spring 48 biases the valve element 44 upward into seating condition against the tapered seat 24. The guiding of the pin is effected except for the approach to the seating condition wherein guide 46 comes into play, by the inner runs 36 of the radial fins. Hence, there is no necessity for additional parts as disclosed in earlier patents to guide and center the valve element and pin assembly.

Also, by virtue of the molded structure including the shapes and their positioning, including the positioning of the ledge 38 closer to the remote end than the shelf 32, a maximized flow of air through the valve in filling or discharging is realized. It should also be noted that intermediate the radial ribs, there is a clear shot for air along the pin 40 through the cylindrical bore 26.

The invention has been disclosed in only one embodiment, but is susceptible of many changes. Thus, the protection sought herein is not limited to the embodiment shown but rather to the claim language below, equivalents to the structure claimed.

I claim:

1. A tire valve for use on a tire comprising:
   a molded rubber body having an opening therethrough;
   a tubular rigid molded plastic insert bonded to the body in the opening, the insert having a tire end adjacent the tire and a remote end remote from the tire, the interior of the insert gradually narrowing from the tire end to a sharply narrowing conical seat intermediate the two ends, the seat surrounding a generally cylindrical inside surface defining a passage toward the remote end, from the remote end the interior having longitudinally disposed circumferentially arranged segments in two alternating groups, the segments of the first group each gradually narrowing from one radius at the remote end to an abrupt shelf inward to meet said generally cylindrical inside surface, the segments of the other group each narrowing from the one radius at the remote end at the same rate of incline as the segments of the first group for some distance to a steep incline and then to an abrupt shoulder inward to a second radius spaced from the longitudinal axis of the insert, the segment then extending longitudinally in a straight run toward the tire end then outward in an abrupt ledge to meet the cylindrical inside surface, the outward ledges of the segments of the said other group being closer to the remote end than the inward shelves of the first group are to the remote end; and
   a valve means comprising a pin reciprocally disposed inside the straight runs of the segments of the other group and guided thereby, a spring surrounding the pin, and the pin having at its remote end an outward annular flange and the spring being compressed between the flange and the shoulder and being centered by the inclines, and a valve element at the end of the pin closer to the tire end and adapted to seat on the conical seat whereby the air flow through the valve when it is open is maximized and whereby the spring urges the valve closed.

2. A tire valve for use on a tire comprising:
   a molded rubber body having an outside configuration adapted to grip a tire rim and an inside configuration providing a tubular passage therethrough,
   a molded, rigid generally tubular insert having one end held rigidly in and conforming to the inside of the tubular passage in the molded rubber body and having the other end extending outwardly of the molded rubber body,
   a conical interior surface of the tubular insert defining a valve seat,
   another portion of the interior surface of the tubular insert defining circumferentially spaced inwardly radially extending ribs, the inner ends of the ribs terminating freely and not connected to adjacent ribs,
   a valve pin including a cylindrical portion engaged by and guided by the inner ends of the ribs, the pin being unencumbered between the ribs, leaving space for air flow,
   a valve element carried by the valve pin and positioned to cooperate with the valve seat, and
   spring means positioned between the outer surfaces of the ribs and the outer end of the valve pin cylindrical portion for biasing the valve element against the valve seat.

* * * * *